No. 631,260. Patented Aug. 15, 1899.
H. PARRENT.
HAY STACKER.
(Application filed Mar. 30, 1899.)
(No Model.) 2 Sheets—Sheet 2.
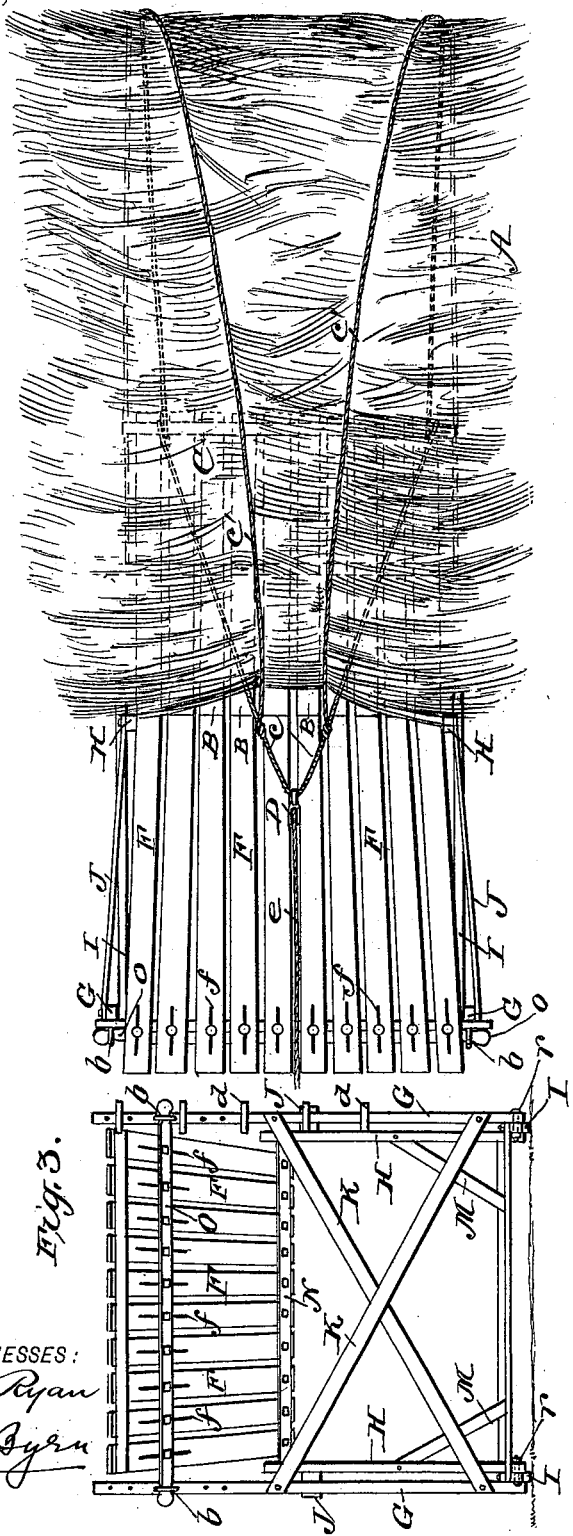
WITNESSES:
Jos. A. Ryan
Edw. W. Byrn
INVENTOR
Henry Parrent
BY Munn & Co.
ATTORNEYS.

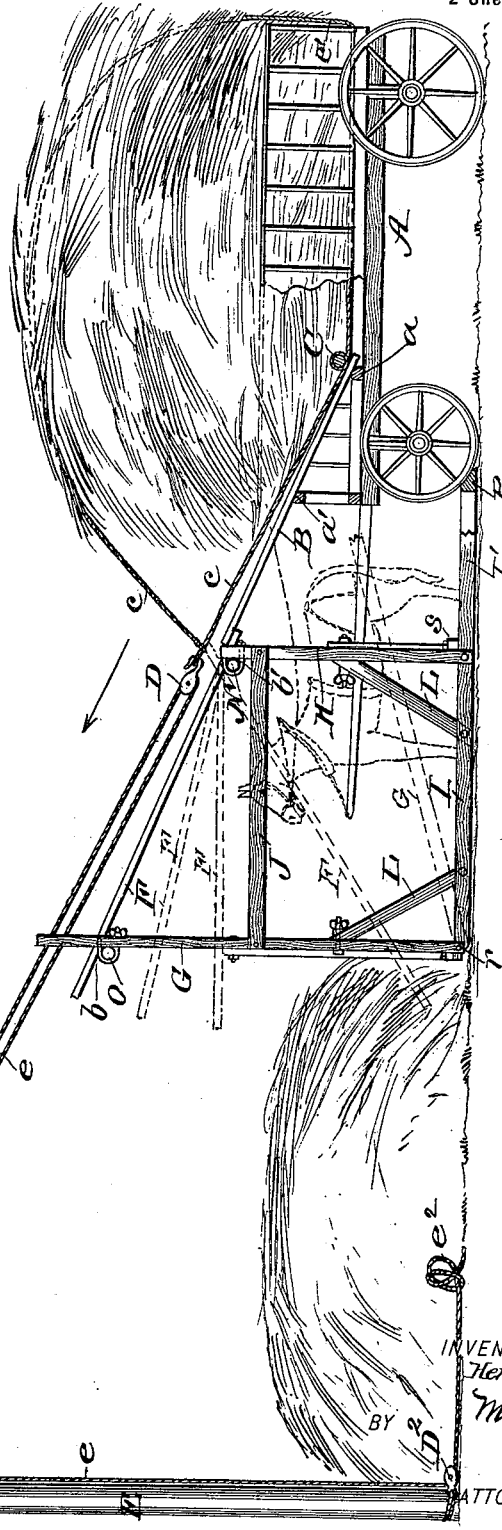

UNITED STATES PATENT OFFICE.

HENRY PARRENT, OF GILTEDGE, MONTANA.

HAY-STACKER.

SPECIFICATION forming part of Letters Patent No. 631,260, dated August 15, 1899.

Application filed March 30, 1899. Serial No. 711,152. (No model.)

*To all whom it may concern:*

Be it known that I, HENRY PARRENT, of Giltedge, in the county of Fergus and State of Montana, have invented a new and useful Improvement in Hay-Stackers, of which the following is a specification.

My invention relates to that form of hay-stacker in which the hay is loaded into the wagon on top of a rope-sling which is arranged to be hitched to a rope running to a pulley on an elevated support and thence extended to the snatch-block operated by a horse, whereby the entire load of hay is at one time pulled off the wagon, raised to a position above the stack, and then dumped in a single operation. With such devices an elevated and inclined platform has been provided which was interposed between the wagon and the haystack and up over which the load of hay is dragged in gaining a position sufficiently elevated to be dumped on top of the stack.

My invention operates on the principle above described; and it consists in the peculiar construction and arrangement of the various parts, whereby it is rendered quickly adjustable, easily transported, and cheaply made, as will be hereinafter fully described with reference to the drawings, in which—

Figure 1 is a side elevation of the entire device. Fig. 2 is a plan view of the wagon with its load of hay and the inclined and elevated platform, and Fig. 3 is a rear view of the inclined and elevated platform.

In the drawings, A, Fig. 1, represents a wagon whose body has the customary hay-rack. In the front part of the wagon-body are arranged longitudinally with it a series of inclined plank skids B, extending from side to side of the wagon-body and resting at their lower ends upon a cross-bar $a$ in the floor of the wagon-body, to which they are bolted or otherwise fastened, and at their middle parts upon the front upper cross-rail $a'$ of the wagon-body or other support, and thence projecting upwardly and forwardly in inclined position. These planks are of lumber somewhat less than two inches thick, ten inches wide, and ten feet long, and they may be either detachably or permanently secured to the two cross-bars $a$ and $a'$ of the wagon and virtually form a part of the wagon-floor and project in front above the rumps of the team.

Before loading the hay into the wagon a rope sling $c\ c'$ is placed in its bottom, with the loop portion $c$, Fig. 2, hanging over the upper ends of the planks B, and thence extending along the planks B along the bottom of the wagon, where its two sides are connected to a movable cross-bar C, which lies loosely on the wagon-floor in transverse position a little above the lower ends of the planks B, and thence extend in parallel lines to the rear end of the wagon, where they hang over the rack or are looped up until the wagon is loaded. When loaded, the hay lies upon the bar C, and the rope ends $c'\ c'$ are carried up and over the entire load of hay, as shown in Figs. 1 and 2, and are, together with the middle part or loop $c$, connected to a hook D or other point of attachment to make a complete sling inclosing the entire load of hay. The two sides of this sling are held together and prevented from slipping off the sides of the load in hauling the same up by the cross-bar C, which forms a part of the sling. The hook D is formed on a pulley-block which is in the loop or bight of a long hoisting-rope $e$. This at its upper end is attached to a tall post E, which is firmly planted in the ground at the point where the stack is to be formed and is sustained upright by suitable guy-ropes. The rope $e$ from the top of this post runs down to the hook-block D, and thence back to a pulley-block D' at the top of the post, and thence down to a pulley-block D² at the bottom of the post, and at its end $e^2$ is connected to the snatch-block and draft attachment of the team.

Between the position of the wagon and the post E and a sufficient distance from the latter to leave room for the haystack there is constructed a portable or knockdown platform having an inclined upper surface over which the load of hay is to be dragged in gaining an elevation sufficient to build the stack. This platform consists of two rear posts G G and two front posts H H, the latter much shorter than the former and connected together on the sides by upper bars J and lower bars I, which latter are in the nature of sills resting flat upon the ground. Inclined crossed braces K K, Fig. 3, connect the rear posts G G, and angle-braces L L and M M connect the vertical posts G H to the horizontal sills. The rear posts G G are pivotally connected to the side sills I by means of a hinge-bolt $r$, so as to fold alongside the said sills, as shown in dotted lines, and all the various parts of the frame as so far described are detachably bolted together by bolts having thumb-nuts that may be quickly tightened up without a wrench, so as to form a portable knockdown frame that may easily be taken down and folded up or transported to another place and set up again.

At the top of the front posts H there is detachably sustained in metal loops $b'$ a crossbar N, and near the top of the rear posts G there is a similar cross-bar O, secured by a metal loop $b$ at a higher elevation. On these two cross-bars there rests a sectional platform composed of a series of planks F, running longitudinally and substantially parallel to each other and in inclined position, which are of the same transverse dimensions as planks B, but somewhat longer. These planks F are bolted at their lower ends to the crossbar N and at their top ends are bolted to the higher cross-bar O. The planks F, however, have longitudinal slots $f$, (see Fig. 3,) through which the bolts pass, so that the bolts may slide in their slots as the elevation of crossbar O is changed in changing the inclination of the platform F. To permit this cross-bar O to be raised or lowered and adjusted to different positions, as shown in dotted lines, the posts G are provided with a series of holes at different elevations to receive the metal loops $b$, that hold the said cross-bars.

Now when the inclined platform has been set up and the load of hay is brought up to the same the wagon-team is driven under the elevated platform, the inclined planks B are made to overlap the lower end of the platform F, as shown in Fig. 1, and the rope sling being connected to hook-block D and the team hitched to the rope $e$ the entire load of hay is dragged up and over the wagon-team and the elevated and inclined platform and is dumped onto the stack which is in process of formation. When the stack is just begun, the platform F is adjusted to its horizontal position at the rear, and as the stack rises the angle of the platform is increased.

In constructing the framework for the platform its basic sills I are extended at I' out on one side to the position of the front wheels of the wagon and are then provided with a crossbar P, which acts as a chock or stop for the wheels of the wagon, which prevents the wagon-body from being pulled up to the platform when the lifting strain on the load of hay is applied.

To enable any of the workmen to conveniently ascend to the top of the platform, one or both of the rear posts G is provided with a series of foothold-cleats $d$, Fig. 3, extending from the bottom to the top.

When a load of hay has been dumped over the end of the platform, the ends $c'$ $c'$ of the sling are disconnected from $c$, and the sling is pulled out either by the team through rope $e$ or by hand.

In taking the device down for transportation, the inclined braces K being first removed, the platform F may be lowered at its rear end to the lowest dotted position F, and the side bar J and braces L being then removed the rear bars G may be folded forward about their pivots $r$, as shown by the dotted lines G.

Having thus described my invention, what I claim as new, and desire to secure by Letters Patent, is—

1. In a hay-stacker of the kind described, the elevated platform, consisting of four vertical posts with horizontal bars and angular braces, the two front posts being made shorter than the rear ones, and having a detachable cross-bar connecting the same, and the rear ones having a cross-bar with locking devices for supporting the same at different elevations, and a series of inclined planks supported on the cross-bars and having a slip connection with the rear cross-bar to accommodate it to different elevations substantially as shown and described.

2. In a hay-stacker of the kind described, an inclined and elevated platform for receiving the load of hay from the wagon, mounted upon vertical posts, in combination with basic sills I extended horizontally at I' beyond its vertical posts to form a stop for the wheels of the wagon substantially as and for the purpose described.

3. In a hay-stacker of the kind described, the combination with an inclined and elevated platform; of a wagon having a cross-bar $a$ in its floor near the front end, and an upper cross-bar $a'$ at its front end, a series of inclined plank skids extending from its floor out over and beyond its upper cross-bar at the end, said planks being adapted to lap over onto the inclined platform, a rope sling arranged to inclose the load, and a block-and-tackle mechanism connecting with the sling substantially as and for the purpose described.

4. The combination of an elevated platform and a hay-stacker wagon having inclined plank skids extending from the floor of the wagon to a support on the front end of the body and thence over and above the team to allow the team to be driven directly under the elevated platform and the load to be taken from the wagon directly over the team as described.

HENRY PARRENT.

Witnesses:
W. M. McCLEAN,
DAMAS TAILLON.